(12) United States Patent
De La Torre

(10) Patent No.: US 7,046,845 B2
(45) Date of Patent: May 16, 2006

(54) METHOD AND APPARATUS FOR COMPENSATING FOR DOT GAIN IN STOCHASTIC PRINTING

(76) Inventor: Jesus Hill De La Torre, Justo Sierra 2387, Guadalajara, Jalisco 44680 (MX)

( * ) Notice: Subject to any disclaimer, the term of this patent is extended or adjusted under 35 U.S.C. 154(b) by 0 days.

(21) Appl. No.: 10/850,352

(22) Filed: May 19, 2004

(65) Prior Publication Data

US 2005/0063588 A1    Mar. 24, 2005

Related U.S. Application Data

(63) Continuation of application No. 09/998,591, filed on Nov. 16, 2001, now Pat. No. 6,741,735, which is a continuation of application No. PCT/IB00/00660, filed on May 17, 2000, and a continuation-in-part of application No. 09/314,861, filed on May 19, 1999, now Pat. No. 6,507,666.

(51) Int. Cl.
G06K 9/00    (2006.01)
G06K 9/32    (2006.01)

(52) U.S. Cl. ....................... 382/167; 382/299
(58) Field of Classification Search ................ 382/162, 382/163, 165, 167, 175, 178, 275, 298, 299, 382/254; 358/459, 503, 506, 512, 515–518, 358/526, 528, 534–540
See application file for complete search history.

(56) References Cited

U.S. PATENT DOCUMENTS

| | | | |
|---|---|---|---|
| 5,363,318 A | 11/1994 | McCauley | |
| 5,640,254 A | 6/1997 | Sexton | |
| 5,677,093 A | 10/1997 | Delabastita et al. | |
| 5,687,300 A | 11/1997 | Cooper | |
| 5,796,929 A | 8/1998 | Shu et al. | |
| 5,818,604 A | 10/1998 | Delabastita et al. | |
| 5,872,896 A | 2/1999 | Li et al. | |
| 6,118,935 A | 9/2000 | Samworth | |
| 6,330,075 B1 | 12/2001 | Ishikawa | |
| 6,540,328 B1 | 4/2003 | Yashima et al. | |

FOREIGN PATENT DOCUMENTS

| | | |
|---|---|---|
| EP | 0 661 869 A1 | 7/1995 |
| EP | 0 734 151 A1 | 9/1996 |
| EP | 0 762 734 A2 | 3/1997 |

*Primary Examiner*—Andrew W. Johns
*Assistant Examiner*—Amir Alavi
(74) *Attorney, Agent, or Firm*—Christensen O'Connor Johnson Kindness PLLC

(57) ABSTRACT

A method for compensating for dot gain in printing with stochastic screens comprises obtaining continuous tone CMYK files and screening the files at a resolution that is lower than the resolution of an output device that will be used to print the files. The lower resolution stochastically screened files are then expanded to the resolution of the output device, thereby effectively increasing the size of the dots by creating a number of subdots for each dot in the lower resolution stochastically screened files. Subdots within the expanded stochastically screened files can then be selectively removed to compensate for dot gain. In addition, overlapping dots in the screened CMYK files are removed and additional stochastically screened files are created that print a dot of a color of the previously overlapping dots and at the location of the previously overlapping dots to prevent colors from running together when printing on certain media. Finally, the removal of subdots in the expanded CMYK files can be performed to correct the color of the images when the expanded stochastically screened file is printed.

3 Claims, 7 Drawing Sheets

50% SCREEN

50% SCREEN WITH 20% DOT GAIN COMPENSATION

OVERLAPPING DOTS IN CMYK FILES

REPLACED DOT

METHOD AND APPARATUS FOR COMPENSATING FOR DOT GAIN IN STOCHASTIC PRINTING

CROSS-REFERENCES TO RELATED APPLICATIONS

This application is a continuation of U.S. patent application Ser. No. 09/998,591, filed Nov. 16, 2001, now U.S. Pat. No. 6,741,735, issued May 25, 2004, which is a continuation of Patent Cooperation Treaty Application No. PCT/IB00/00660 filed May 17, 2000, which designates the United States, and is a Continuation-in-Part of U.S. patent application Ser. No. 09/314,861, filed May 19 1999, now U.S. Pat. No. 6,507,666, issued Jan. 14, 2003, the benefit of which is hereby claimed under 35 U.S.C. § 120.

FIELD OF THE INVENTION

The present invention relates to printing methods in general, and in particular to methods for compensating for dot gain without decreasing tonal range or losing detail.

BACKGROUND OF THE INVENTION

One of the most common artifacts that occurs in printing is dot gain. Dot gain occurs when the size of an ink dot that is printed on a media such as paper, fabric, aluminum, plastic, etc. is larger than desired. Dot gain can occur due to the compression of ink as it is pressed onto the media as well as by the spreading of the ink when absorbed by certain media such as news print, etc. In addition, dot gain can occur as a result of flaws in output devices using the printing process.

Because smaller dots are affected by dot gain more than larger dots, the artifact is particularly noticeable in stochastic screening whereby all the dots that comprise the images are the same size and relatively small. In the past, most methods of compensating for dot gain involved the redistribution and/or removal of a number of dots that are printed. However, the redistribution and/or removal of dots generally reduces the number of dots per unit area, thereby causing a corresponding loss of detail and diminishing the tonal range in there resulting image.

Given the problems associated with dot gain in stochastic printing, there is a need for a mechanism that can compensate for dot gain without removing detail and/or tonal range from an image.

SUMMARY OF THE INVENTION

To address the problems caused by dot gain in printing that utilizes stochastic screens, the present invention comprises a method of creating stochastic screens wherein the size of the individual dots in the screens are modified to compensate for dot gain that occurs during the printing process.

Continuous tone cyan, magenta, yellow and black (CMYK) images are received at a first resolution. A CMYK continuous tone image is applied to a screening program that creates stochastic CMYK files at the first resolution. The CMYK files are then expanded to the resolution of an output device that will print the image. As a result of the integer expansion, each dot in the original stochastic screen file will be represented as multiple subdots in the expanded stochastic screen file. One or more of the multiple subdots that correspond to each dot in the original stochastic screen file are removed to compensate for dot gain that occurs when the expanded stochastically screened images are printed. In addition, the removal of some of the subdots aids linearization by improving the tonal range.

According to another embodiment of the invention, the system determines when dots in the original stochastic screen files overlap to create a particular color. These dots are then removed from the original stochastically screened files and additional screen files are added that print dots with the color and the location of the previously overlapping dots.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

As indicated above, the present invention is a method for compensating for dot gain in printing methods that use stochastic screens.

Figure 1:
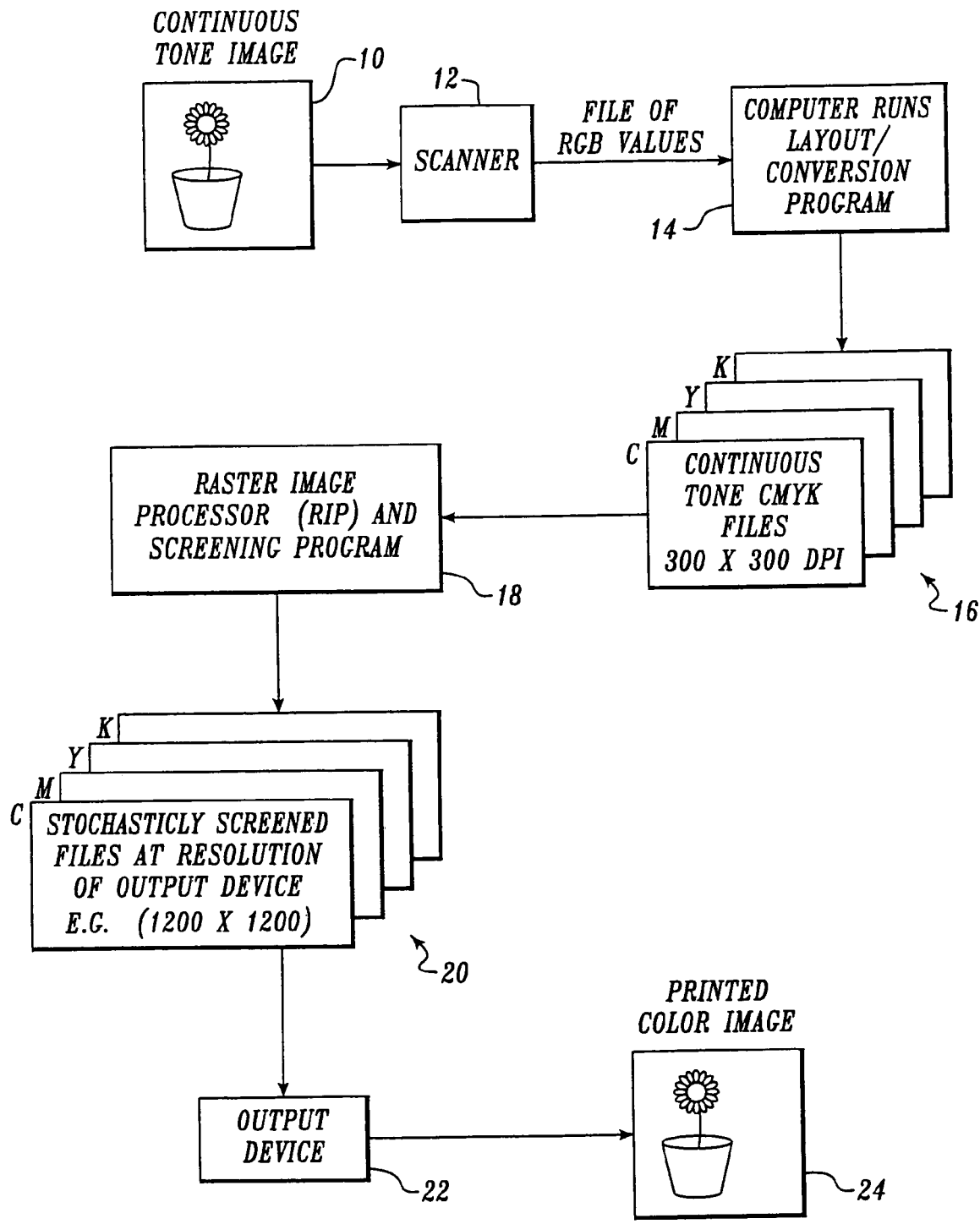
FIG. 1 is a block diagram of a conventional stochastic screening process.

FIG. 1 illustrates a conventional printing system that utilizes stochastic screens. A continuous tone image 10, such as a photograph, is applied to a scanner 12 that converts the continuous tone image into a series of RGB values that can be displayed on a computer screen. The RGB values are applied to a computer 14 that runs a layout program that allows an operator to adjust the position of the photograph on a page, add text, etc., and otherwise prepare a document for printing. The computer system also runs a conversion program that converts the RGB values into a series of continuous tone grey scale files that represent cyan, magenta, yellow and black (CMYK). The continuous tone files for each color typically have the same resolution as the RGB files produced by the scanner 12.

In order to print the continuous tone CMYK files 16, the CMYK files 16 are applied to raster image processor (RIP) and a screening program 18. In conventional printing with stochastic screens, the RIP increases the resolution of the continuous tone files to the resolution of an output device that will be used to produce bit mapped files in the printing process. The increased resolution is obtained by scaling up the continuous tone CMYK files depending on the resolution of the output device. For example, if a continuous tone CMYK file has a resolution of 300×300 pixels per inch and the output device has a resolution of 2400×2400 dpi, then the continuous tone CMYK file would grow 64 times to match the output device resolution. After increasing the resolution of the continuous tone CMYK, the screening program converts the individual CMYK pixels into a stochastic pattern of dots in accordance with the intensity of each of the CMYK pixels. The output of the RIP and the screening program 18 are a series of bit mapped CMYK stochastic screen files 20 having a resolution equal to the resolution of the output device. The high resolution stochastic screen files 20 are then applied to the output device such as a printer 22 that produces a color image 24 from the bit-mapped files.

As indicated above, one of the most typical artifacts that occurs with printing is dot gain. Dot gain occurs when the size of the ink dot placed on the media on which the image is to be printed is different (usually larger) than the size of the ink dot requested. For example, when the ink is pressed onto the printing media, the compression causes the ink to expand. In addition, the ink may soak into certain types of media, such as newsprint, thereby increasing the size of the dots produced.

In conventional printing using stochastic screens, dot gain is estimated by printing a test image, measuring the size of the dots produced with a densitometer and then adjusting the high resolution stochastic CMYK files to compensate for any dot gain. Such compensation typically involves the removal and/or rearrangement of dots from the stochastic screen files. Because the continuous tone CMYK files are expanded prior to conversion into stochastic screen files, removal of dots from the stochastic screen files causes a corresponding reduction in the level of detail and tonal range in the final printed image.

Figure 2:
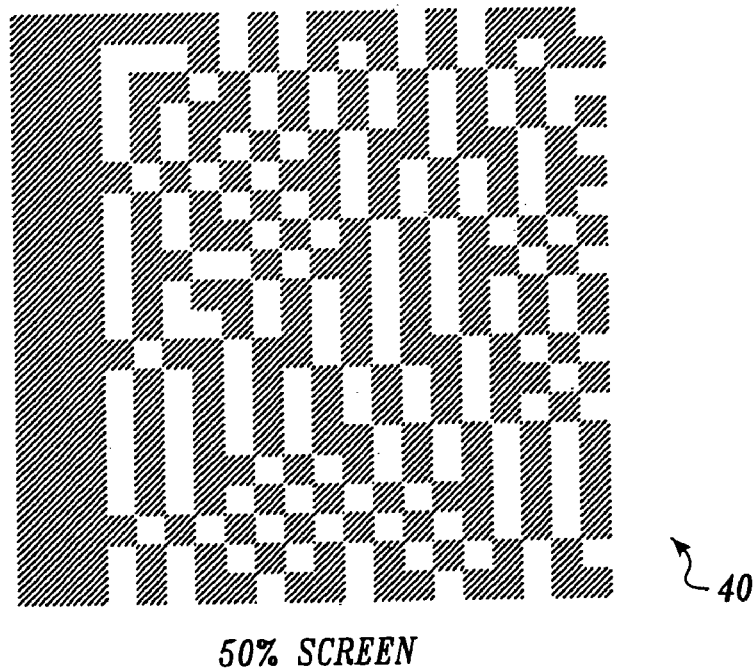
FIG. 2 illustrates a conventional method of compensating for dot gain by the removal and rearrangement of dots.
Figure 2:
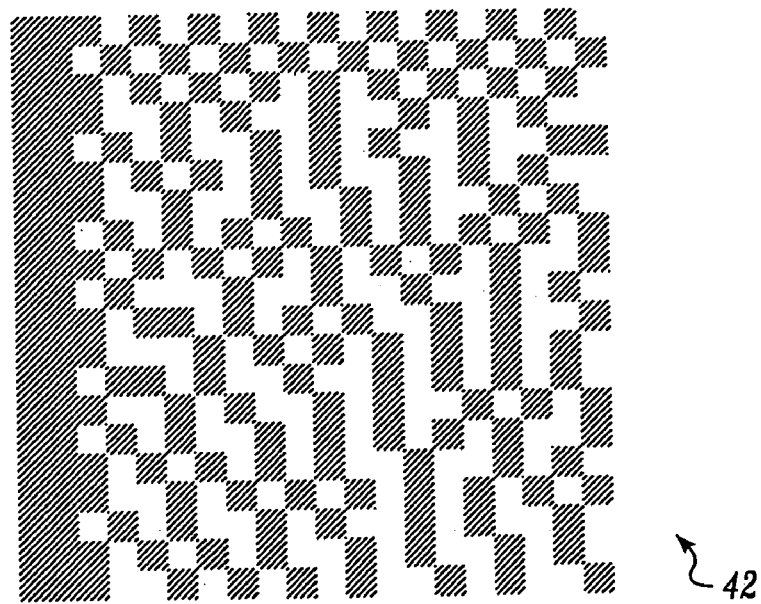

FIG. 2 illustrates a conventional method of compensating for dot gain in a stochastic screen. An image 40 represents a portion of a stochastic screen at a 50% grey scale value. An image 42 represents a portion of a stochastic screen at a 50% grey scale value with a number of dots removed to compensate for a 20% dot gain. As can be seen by viewing the two images 42 and 40, some of the dots in the image 40 are removed from the image 42 and the pattern of dots has changed. The removal of dots and the modification in their position results in a loss of information and detail in the image that is eventually printed.

In contrast to the conventional method of compensating for dot gain by removal of information from the image, the present invention increases the size of the dots in the stochastic screen files and then reduces the size of the dots to compensate for dot gain. To increase the size of the dots in the stochastic screen files, the present invention screens the continuous tone CMYK files without first increasing their resolution to equal the resolution of the output device. Once the files are screened, then the files are expanded to equal the resolution of the output device. Expanding the screened files effectively makes each dot in the stochastic screen file larger. Subdots, i.e., portions of these larger dots can then be selectively removed to compensate for dot gain. The result of the subdot shaving is a stochastic screen with dots of uneven sizes and shapes.

Figure 3:
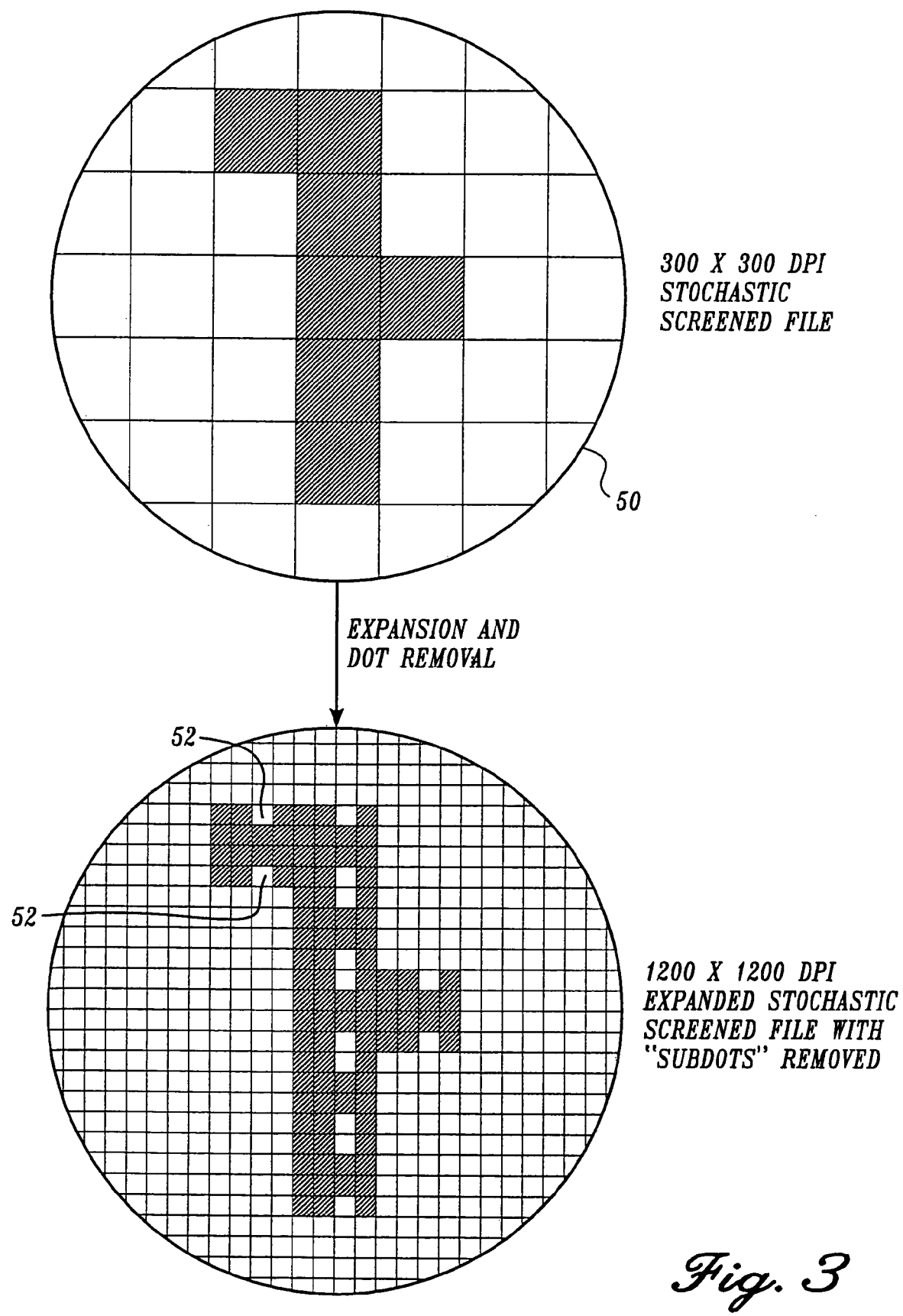
FIGS. 3 and 3A illustrate a method in which dots in a lower resolution stochastic screen file are expanded to create a number of subdots and a portion of the subdots are removed to compensate for dot gain, according to the present invention.

FIG. 3 illustrates a portion 50 of a stochastic screen file at a relatively low, e.g., 300×300 dpi resolution. If the file were expanded to a 1,200×1,200 resolution, then each dot in the portion 50 would be expanded to be 16 "subdots" in the expanded file. With 16 subdots in the expanded file representing a single dot in the lower resolution stochastic screen file, certain subdots 52 can be removed from the expanded file to compensate for dot gain. The particular subdots which are removed can be selected by a user through a computer interface which allows a user to select which subdots are removed. In the presently preferred embodiment of the invention, subdots are generally removed from the periphery of the cluster of subdots to compensate for the expansion of the ink that occurs with dot gain. Because the removal of some subdots from the expanded stochastic screen file does not correspond to the removal of an entire dot in the lower resolution stochastic screen file, the resulting images do not exhibit a corresponding loss of detail.

Figure 3A:
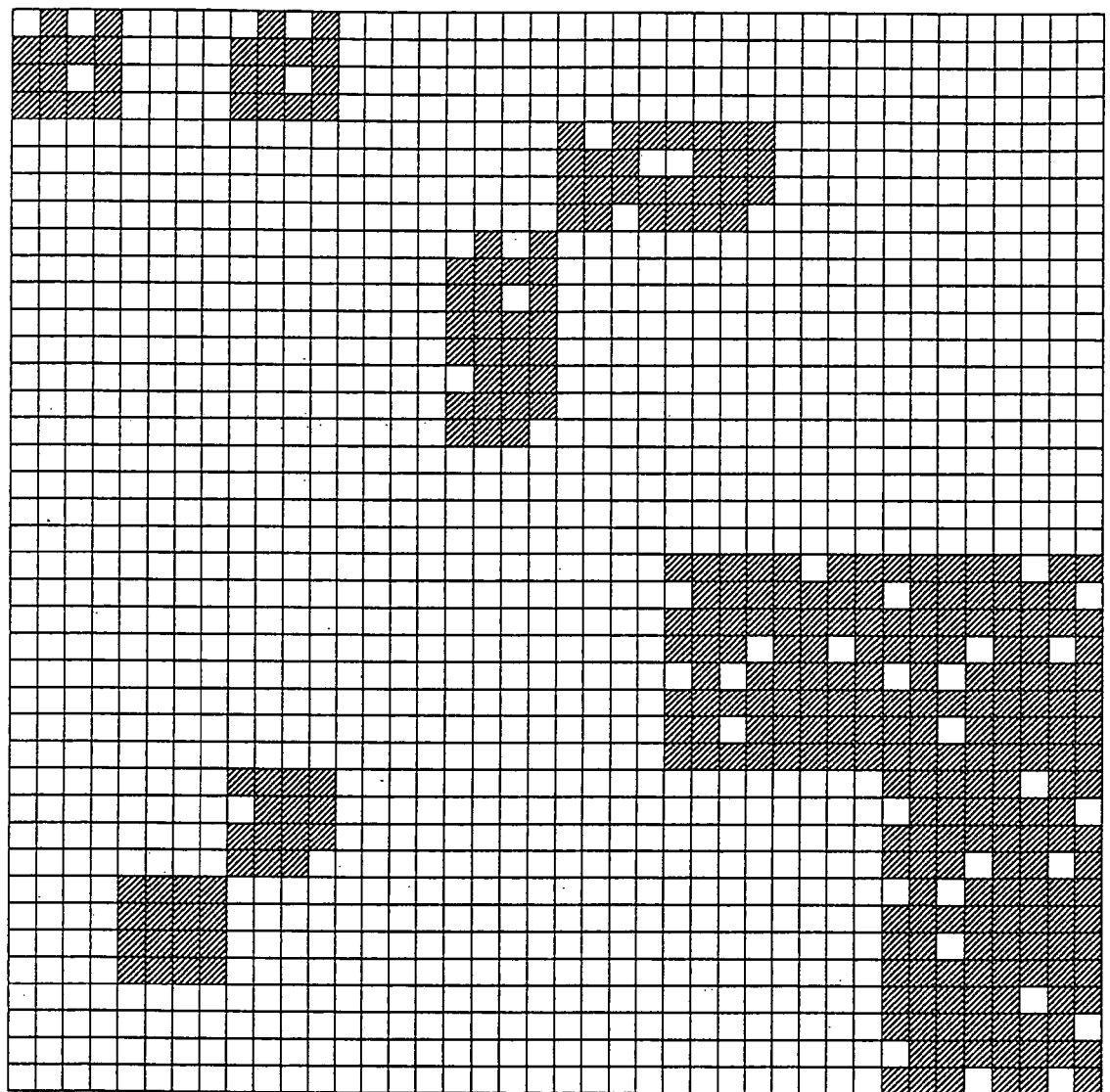
Figure 3A:
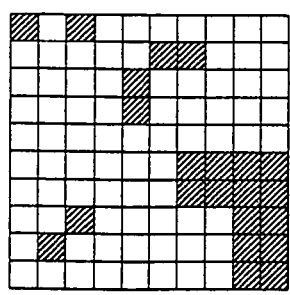
Figure 3A:
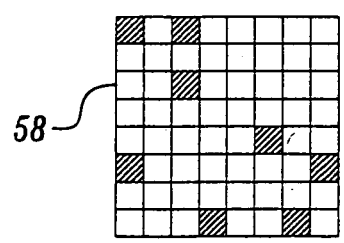

In the example shown in FIG. 3, the same subdots are removed from each cluster of subdots. However, this is not necessarily required. FIG. 3A illustrates a portion of a lower resolution stochastically screened file 54. The file can be expanded by four times to create an expanded stochastically screened file 56. In the expanded stochastically screened filed 56, each dot in the file 54 is represented as a cluster of sixteen subdots. A mask 58 that is larger than each 4×4 cluster can be defined (in this case the mask is 8×8) having certain subdots removed (as indicated by the black dots). The mask is laid over the expanded stochastically screened file 56 to determine which subdots in the expanded stochastically screened file should be removed.

The particular subdots in the mask that are removed in the mask may be fixed or be random. The use of a mask that is larger than the clusters of subdots allows for a more accurate compensation for dot gain. Not all the dots in the expanded stochastically screened file need to be compensated in the same way. Similarly, different patterns or number of subdots may be removed from the different color screens.

Figure 4:
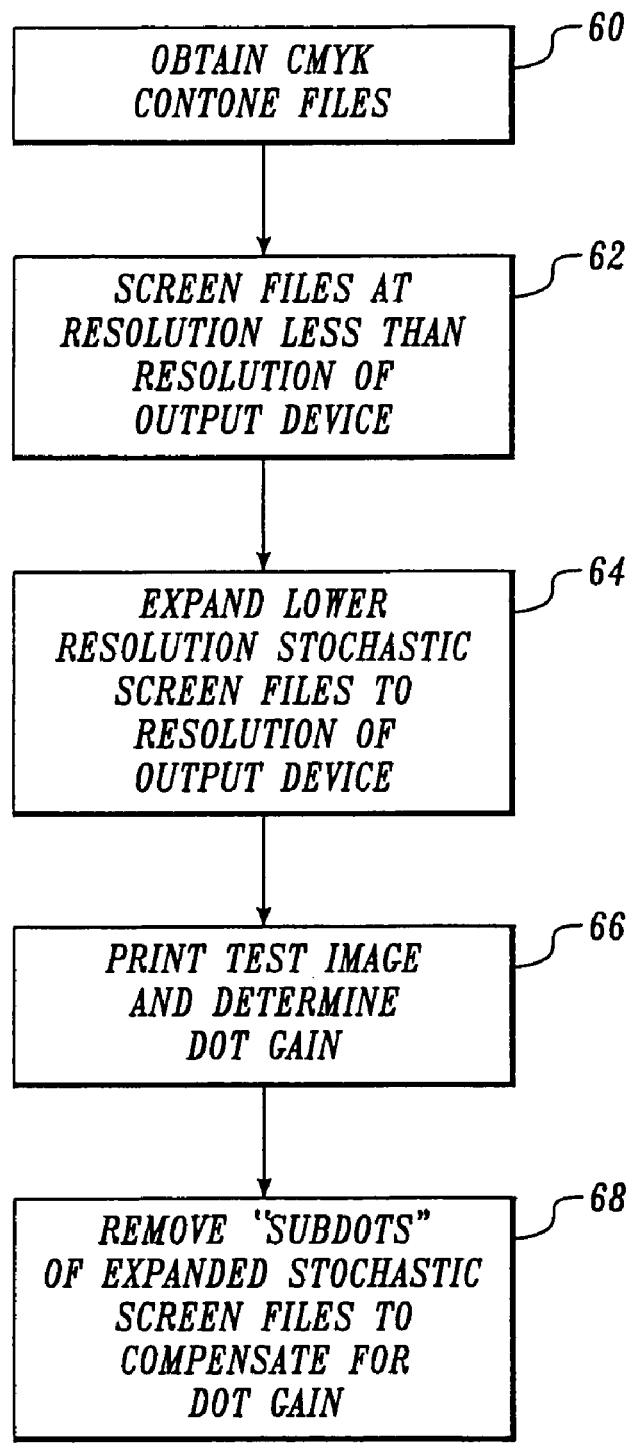
FIG. 4 is a flow chart of the steps performed by the present invention to compensate for dot gain.

FIG. 4 illustrates a flow chart of the steps performed by the present invention to compensate for dot gain. Beginning at a step 60, the continuous tone CMYK files are created by a scanner or received in a computer-readable form such as from a disk or over a computer network. At a step 62, the continuous tone files are stochastically screened at a resolution that is less than the resolution of an output device such as a printer, image setter, or other device that will be used to print the images. At a step 64, the lower resolution stochastic screen files are expanded to have a resolution that is equal to the resolution of the output device.

At a step 66, a test image is printed and a densitometer is used to measure the dot gain of the printed image. Once the dot gain has been computed, the expanded stochastic screen files are modified to remove certain subdots to compensate for dot gain at a step 68.

The particular subdots removed from the expanded stochastic screen may be determined with a look-up table based on past experiences with prior printing jobs. Alternatively, certain subdots can be removed and another test image printed to determine if the dot gain has been properly compensated.

Figure 5:
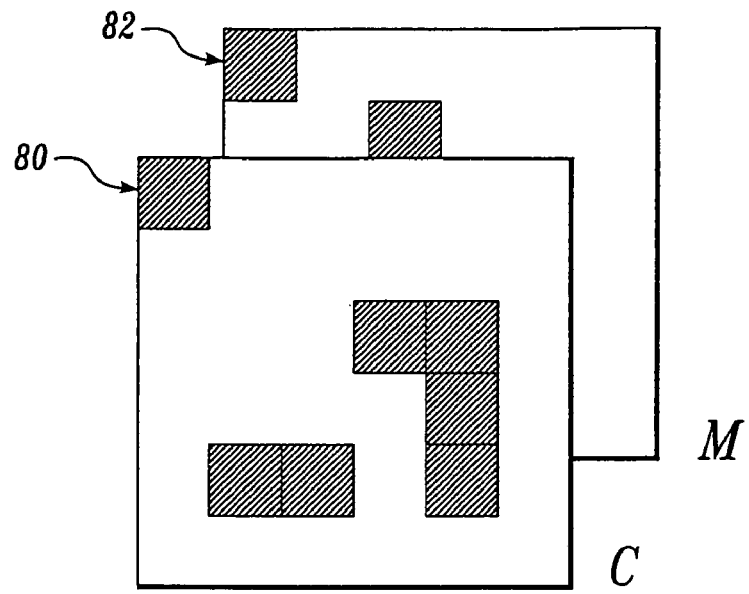
FIG. 5 illustrates a method in which overlapping dots in CMYK stochastic screen files are removed and replaced by additional screens that print a dot of a corresponding color at the location of the overlapping dots, according to another aspect of the present invention.
Figure 5:
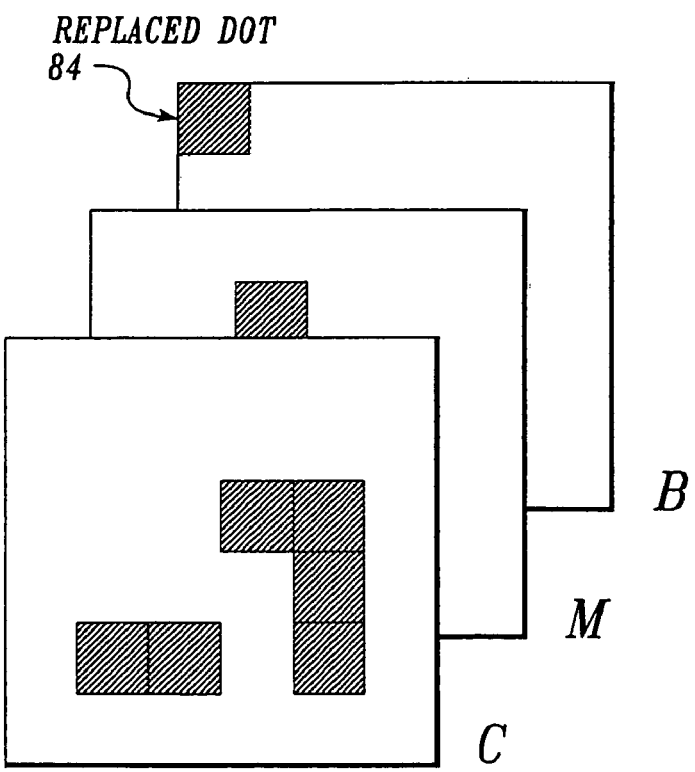

Another benefit of the present invention is the ability to control when inks in a printing process are deposited directly over each other. In many printing jobs, such as printing on metal or on absorbent fabric, the deposit of two different colored inks directly over each other creates a muddy or more otherwise blurred image. Therefore, the present invention can analyze the stochastic screen files to determine when dots of different colors are deposited directly over each other. As illustrated in FIG. 5, to prevent the blurring, the present invention turns off those overlying dotes and replaces them with a dot in another stochastic screen file that will deposit a color equal to the color combination produced by the previously overlapping dots. For example, if a dot 80 in a cyan file overlaps with a dot 82 in a magenta file, the resulting combination should be blue. Therefore, both dots can be removed from the stochastic screen files and an additional screen created have a dot 84 that will deposit blue ink at the location of the previously overlapping dots. When the dots are expanded to have a resolution equal to the resolution of the output device that will print the image, subdots in the expanded files can be removed to compensate for dot gain. To prevent colors from running together, at least one full row and one full column of the subdots at the periphery of each cluster should be removed.

Figure 6:
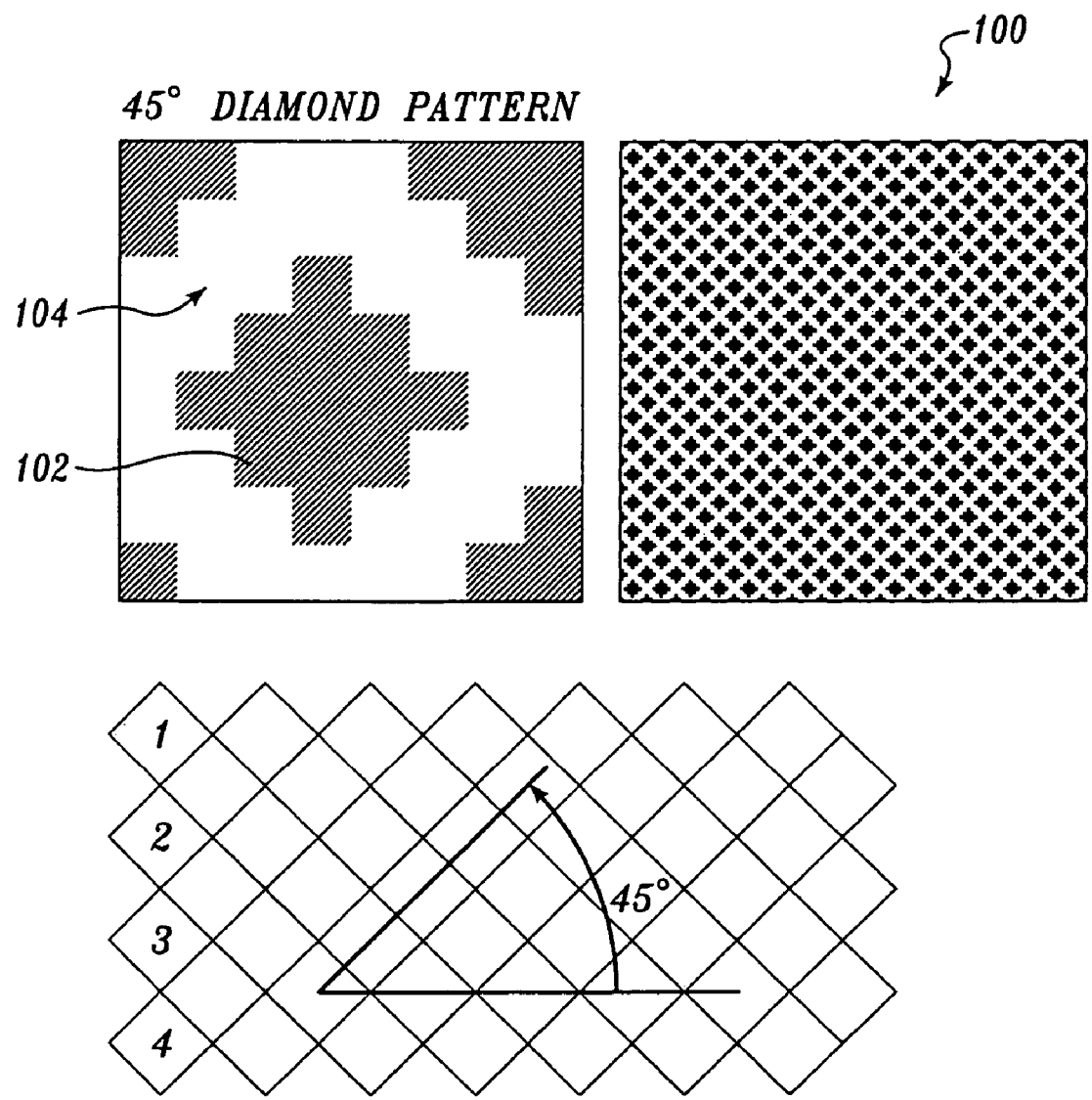
FIG. 6 illustrates a common stochastic pattern that can be compensated for dot gain by removing one or more subdots.

FIG. 6 illustrates one common stochastic screen pattern used in gravure and flexography printing. The pattern 100 is a diamond shape 102 that is surrounded by 45° clear areas of grooves 104. For gravure, both the size of the center diamond and the size of the 45° grooves are equally important and independent of each other. In the example shown, the center diamond had a width of 5 dots and has a groove that is 3 dots wide. The size could be varied such as having a center diamond that is 15 dots wide surrounded by a groove that is 2 dots wide depending on the resolution desired. Individual subdots of center diamonds can be selectively removed to compensate for the dot gain that occurs in the printing process.

Another benefit of the present invention is to perform color calibration for example, if the expected color, in the CMYK color gamut, of the combination of 100% yellow and 100% magenta should be the color red, and if, instead the resulting color at printing that combination is the color orange, then a method for color correction is required. A method for compensating the color according to the present invention is to reduce the amount of yellow color by removing some of the subdots of the higher resolution stochastically screened yellow file. Therefore the color combination will print the correct color red.

The changes for color compensation are for particular areas of the image, so the entire image has to be analyzed in small portions of the stochastic combinations; unless whole areas of the image are of the same combination CMYK colors, as in the case of spot color simulation through CMYK color combination.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of preventing color overlap in stochastic screen printing, comprising:
    receiving continuous tone CMYK files;
    screening the continuous tone CMYK files to produce stochastic CMYK screen files at a resolution less than the resolution of an output device;
    determining if there are overlapping dots in the stochastic CMYK screen files and if so, removing the overlapping dots and adding one or more additional stochastic screen files having dots at the position of the overlapping dotes; and
    printing colors with the additional stochastic screen file that represent the color of overlapping dots.

2. The method of claim 1, further comprising expanding the stochastic screen files to create a number of subdots for each dot in the stochastic screen files and selectively removing subdots in the expanded stochastic screen file to compensate for dot gain.

3. The method of claim 2, further comprising removing the subdots from a row and column of a cluster of subdots that correspond to a single dot in the lower resolution stochastic screen file to prevent colors from running together.

* * * * *

UNITED STATES PATENT AND TRADEMARK OFFICE
CERTIFICATE OF CORRECTION

PATENT NO. : 7,046,845 B2  Page 1 of 1
APPLICATION NO. : 10/850352
DATED : May 16, 2006
INVENTOR(S) : J. Hill De La Torre It is certified that error appears in the above-identified patent and that said Letters Patent is hereby corrected as shown below:

Title Page item 12

| COLUMN | LINE | ERROR |
|---|---|---|
| (12) Pg. 1, col. 1 | Inventor | "De La Torre" should read --Hill De La Torre-- |

Signed and Sealed this

Twenty-eighth Day of October, 2008

JON W. DUDAS
*Director of the United States Patent and Trademark Office*